(12) United States Patent
Bastian et al.

(10) Patent No.: US 11,232,641 B2
(45) Date of Patent: *Jan. 25, 2022

(54) MIXING VIRTUAL IMAGE DATA AND PHYSICAL IMAGE DATA

(71) Applicant: Wayfair LLC, Boston, MA (US)

(72) Inventors: David C. Bastian, Addison, IL (US); Aaron K. Baughman, Silver Spring, MD (US); Nicholas A. McCrory, Sacramento, CA (US); Todd R. Whitman, Bethany, CT (US)

(73) Assignee: Wayfair LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,191

(22) Filed: Oct. 5, 2020

(65) Prior Publication Data

US 2021/0019952 A1 Jan. 21, 2021

Related U.S. Application Data

(63) Continuation of application No. 16/554,010, filed on Aug. 28, 2019, now Pat. No. 10,839,611, which is a (Continued)

(51) Int. Cl.
*G06T 19/00* (2011.01)
*G06Q 50/00* (2012.01)
(Continued)

(52) U.S. Cl.
CPC ............ *G06T 19/006* (2013.01); *G05D 3/12* (2013.01); *G06F 40/117* (2020.01); *G06Q 50/00* (2013.01); *G06T 15/503* (2013.01)

(58) Field of Classification Search
None
See application file for complete search history.

(56) References Cited

U.S. PATENT DOCUMENTS 9,171,404 B1 10/2015 Johnson
10,249,096 B2 4/2019 Bastian et al.
(Continued)

OTHER PUBLICATIONS

[No Author Listed], Adobe Photoshop File Formats Specification. Adobe Systems Incorporated. Mar. 7, 2012. https://web.archive.org/web/20120428021302/http://www.adobe.com:80/deynet-apps/photoshop/fileformatashtml/PhotoshopFileFormats.htm#50577409_89817 [last accessed May 15, 2018]. 40 pages.

(Continued)

*Primary Examiner* — Nicholas R Wilson
(74) *Attorney, Agent, or Firm* — Wolf, Greenfield & Sacks, P.C.

(57) ABSTRACT

Methods, computer program products, and systems are presented. The method computer program products, and systems can include, for instance: obtaining virtual image data representing a virtual object; and encoding the virtual image data with physical image data to provide a formatted image file, wherein the encoding includes for a plurality of spatial image elements providing one or more data field that specifies physical image information and one or more data field that specifies virtual image information based on the virtual image data so the formatted image file for each of the plurality of spatial image elements provides physical image information and virtual image information, and wherein the encoding includes providing indexing data that associates an identifier for the virtual object to spatial image elements for the virtual object.

20 Claims, 11 Drawing Sheets

Related U.S. Application Data continuation of application No. 16/205,993, filed on Nov. 30, 2018, now Pat. No. 10,403,052, which is a continuation of application No. 15/597,548, filed on May 17, 2017, now Pat. No. 10,249,096.

(51) Int. Cl.
| | |
|---|---|
| *G06F 40/117* | (2020.01) |
| *G06T 15/50* | (2011.01) |
| *G05D 3/12* | (2006.01) |

(56) References Cited

U.S. PATENT DOCUMENTS

| 10,249,098 | B2 | 4/2019 | Bastian et al. |
| 10,403,052 | B2 | 9/2019 | Bastian et al. |
| 2012/0176410 | A1 | 7/2012 | Meier |
| 2014/0152698 | A1 | 6/2014 | Kim et al. |
| 2014/0320489 | A1 | 10/2014 | Chizeck |
| 2015/0254904 | A1 | 9/2015 | Ur |
| 2016/0314622 | A1 | 10/2016 | Davis |
| 2018/0336727 | A1 | 11/2018 | Bastian et al. |
| 2018/0336730 | A1 | 11/2018 | Bastian et al. |
| 2019/0102954 | A1 | 4/2019 | Bastian et al. |
| 2019/0385378 | A1 | 12/2019 | Bastian et al. |

OTHER PUBLICATIONS

[No Author Listed], How to search by Image. Google. Nov. 23, 2013. https://web.archive.org/web/20131123201742/https://support.google.corn/websearch/ananswe/1325808?hl=en# [last accessed May 17, 2018]. 3 pages.

Bruder et al., Enhancing presence in head-mounted display environments by visual body feedback using head-mounted cameras. 2009 International Conference on CyberWorlds. Sep. 7, 2009:43-50.

Davis, Knowing Google Image Basics. Google. Sep. 7, 2016. https://web.archive.org/web/20160907015921/http://www.dummies.com/education/internet-basics/knowing-google-images-basics/ [last accessed May 17, 2018]. 3 pages.

Farabet et al., Learning hierarchical features for scene labeling. IEEE transactions on pattern analysis and machine intelligence. Oct. 24, 2012;35(8):1915-29.

LinkedIn, "Assembling MRI Slices into a 3D Volume" https://www.youtube.com/watch?v=f4IPsdTn7c8, 2015.

Lyndia.com, "Photoshop tutorial: How to Composite a Person," https://www.youtube.com/watch?v=LM4z2JR4dwA, 2010.

Mell et al., The NIST Definition of Cloud Computing. NIST Special Publication 800-145. Sep. 2011:7 pages.

N. Clements "Best New Features of Photo shop CS6—Autosave-Recovery," https://www.youtube.com/watch?v=3h-No62xHf4, 2012.

Vincent et al., MINC 2.0: a flexible format for multi-modal images. Frontiers in neuroinformatics. Aug. 11, 2016;10:35.

U.S. Appl. No. 15/597,548, filed May 17, 2017, Bastian et al.

U.S. Appl. No. 15/836,451, filed Dec. 8, 2017, Bastian et al.

U.S. Appl. No. 16/205,993, filed Nov. 30, 2018, Bastian et al.

U.S. Appl. No. 16/554,010, filed Aug. 28, 2019, Bastian et al.

Applicant's Response to Final Office Action, U.S. Appl. No. 15/836,451, filed Dec. 8, 2017, dated Oct. 31, 2018.

Applicant's Response to Non-Final Office action for U.S. Appl. No. 15/597,548, filed May 17, 2017, dated Jun. 29, 2018.

Applicant's Response to Non-Final Office action for U.S. Appl. No. 15/836,451, filed Dec. 8, 2017, dated Jun. 29, 2018.

Final Office action for U.S. Appl. No. 15/836,451, filed Dec. 8, 2017, dated Oct. 19, 2018.

List of IBM Patent and/or Patent Applications treated as related for U.S. Appl. No. 16/205,993, filed Nov. 30, 2018, dated Dec. 19, 2018.

Non-Final Office action for U.S. Appl. No. 15/597,548, filed May 17, 2017, dated May 22, 2018.

Non-Final Office action for U.S. Appl. No. 15/836,451, filed Dec. 8, 2017, dated May 22, 2018.

Non-Final Office Action, U.S. Appl. No. 15/597,548, filed May 17, 2017, dated Jan. 10, 2018.

Notice of Allowance, U.S. Appl. No. 15/836,451, filed Dec. 8, 2017, dated Nov. 15, 2018.

Response to Non-Final Office Action, U.S. Appl. No. 15/597,548, filed May 17, 2017, dated Feb. 28, 2018.

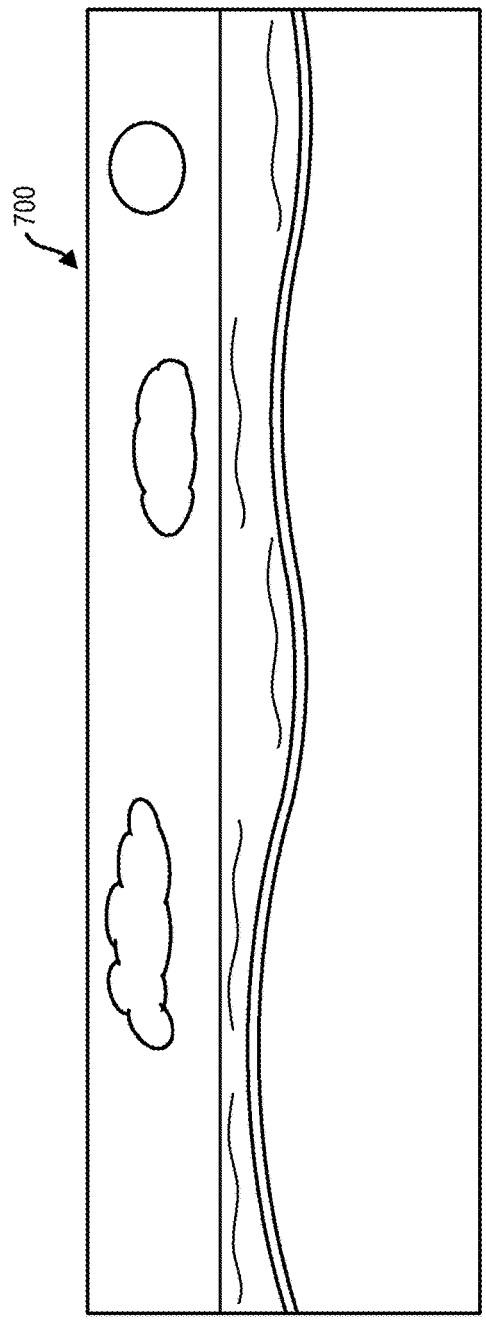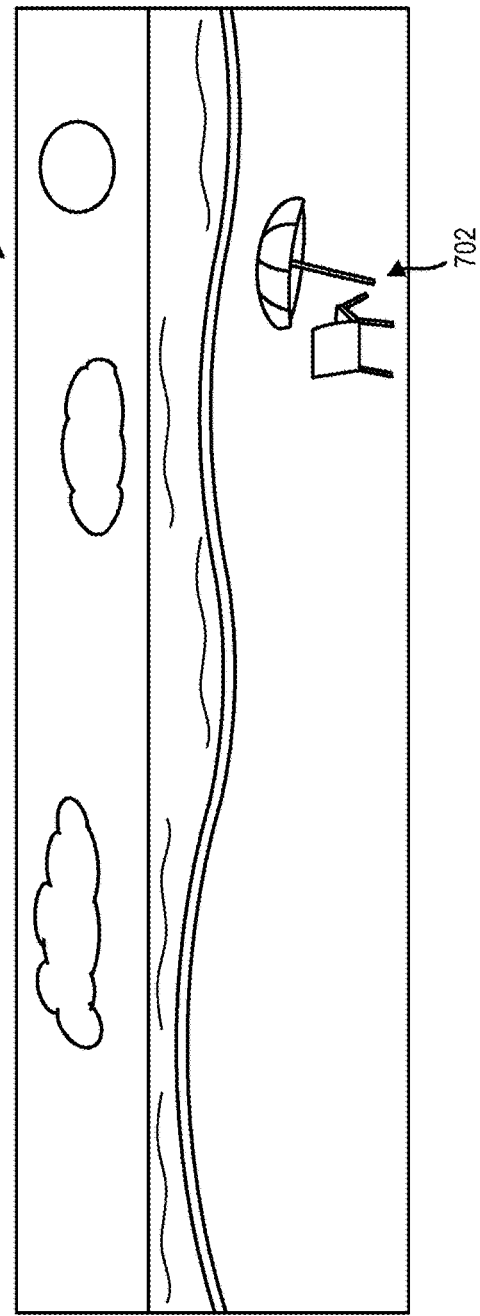
FIG. 7
FIG. 8

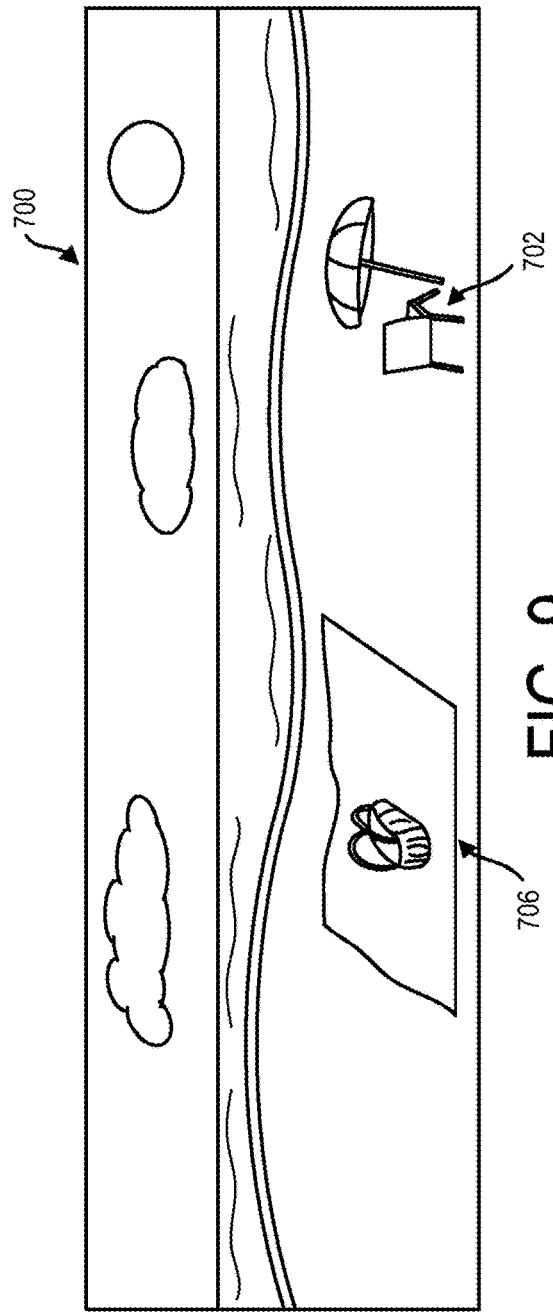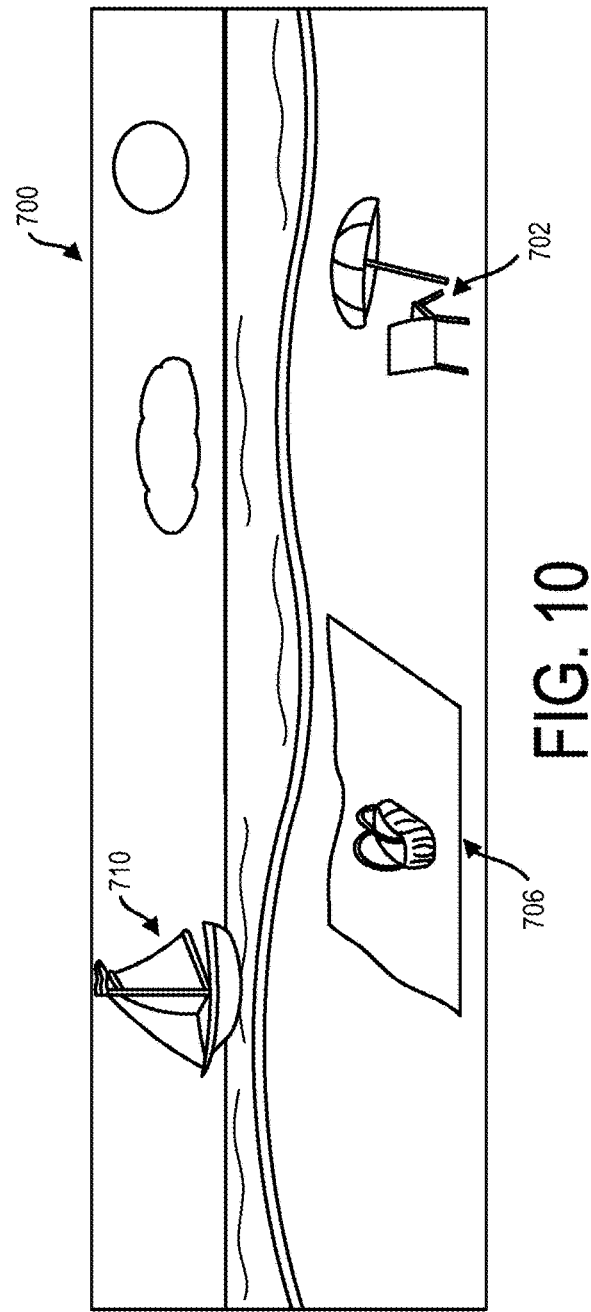

MIXING VIRTUAL IMAGE DATA AND PHYSICAL IMAGE DATA

CROSS-REFERENCE TO RELATED APPLICATIONS

This application claims priority under 35 U.S.C. § 120 and is a continuation of U.S. application Ser. No. 16/554,010, filed Aug. 28, 2019, entitled "MIXING VIRTUAL IMAGE DATA AND PHYSICAL IMAGE DATA", which claims priority under 35 U.S.C. § 120 and is a continuation of U.S. application Ser. No. 16/205,993, filed Nov. 30, 2018, entitled "MIXING VIRTUAL IMAGE DATA AND PHYSICAL IMAGE DATA", which claims priority under 35 U.S.C. § 120 and is a continuation of U.S. application Ser. No. 15/597,548, filed May 17, 2017, entitled "MIXING VIRTUAL IMAGE DATA AND PHYSICAL IMAGE DATA". The entire contents of these applications are incorporated herein by reference in their entirety.

BACKGROUND

Unlike virtual reality systems that allow users to experience a completely virtual or simulated world, augmented reality systems allow users to experience a mixed reality that combines virtual objects with physical real-world objects. Video special effects, as seen in commercials, television programs, and movies, offer a glimpse at some of the possibilities when artificial images can be seamlessly combined with real images for example, cars that seem to dissolve before one's eyes offering cut-away views, or animated characters in the kitchen encouraging kids to eat their breakfast. Unlike video special effects, augmented reality systems support the perception of real special effects or special effects happening right where a person is in real time and in real space. For example, imagine a person walking into a parking lot and looking at a car while wearing special eyeglasses, or looking through the viewfinder of a special video camera, who is then able to see a cut-away view of the car exposing the complete exhaust system perfectly aligned with the real car. That person is perceiving a real special effect or experiencing augmented reality.

SUMMARY

Shortcomings of the prior art are overcome, and additional advantages are provided, through the provision, in one aspect, of a method. The method can include, for example: obtaining virtual image data representing a virtual object; and encoding the virtual image data with physical image data to provide a formatted image file, wherein the encoding includes providing for each spatial image element of a plurality of spatial image elements one or more data field that specifies physical image information and one or more data field that specifies virtual image information so that the formatted image file includes physical image information and virtual image information for said each spatial image element of a plurality of spatial image elements, and wherein the encoding includes providing indexing data that associates an identifier for the virtual object to a set of spatial image elements for the virtual object so that the formatted image file includes the indexing data.

In another aspect, a computer program product can be provided. The computer program product can include a computer readable storage medium readable by one or more processing unit and storing instructions for execution by one or more processor for performing a method. The method can include, for example: obtaining virtual image data representing a virtual object; and encoding the virtual image data with physical image data to provide a formatted image file, wherein the encoding includes providing for each spatial image element of a plurality of spatial image elements one or more data field that specifies physical image information and one or more data field that specifies virtual image information so that the formatted image file includes physical image information and virtual image information for said each spatial image element of a plurality of spatial image elements, and wherein the encoding includes providing indexing data that associates an identifier for the virtual object to a set of spatial image elements for the virtual object so that the formatted image file includes the indexing data.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining virtual image data representing a virtual object; and encoding the virtual image data with physical image data to provide a formatted image file, wherein the encoding includes providing for each spatial image element of a plurality of spatial image elements one or more data field that specifies physical image information and one or more data field that specifies virtual image information so that the formatted image file includes physical image information and virtual image information for said each spatial image element of a plurality of spatial image elements, and wherein the encoding includes providing indexing data that associates an identifier for the virtual object to a set of spatial image elements for the virtual object so that the formatted image file includes the indexing data.

Shortcomings of the prior art are overcome, and additional advantages are provided, through the provision, in one aspect, of a method. The method can include, for example: rendering a formatted image file that includes first spatial image elements having specified physical image information and second spatial image elements having virtual image information, wherein the rendering includes applying a first rendering process for rendering the physical image information and applying a second rendering process for rendering the virtual image information, wherein the second rendering process for rendering the virtual image information is differentiated from the first rendering process for rendering the physical image information.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 7-10 are depictions image representations depicting features as set forth herein in one embodiment;

DETAILED DESCRIPTION

Figure 1:
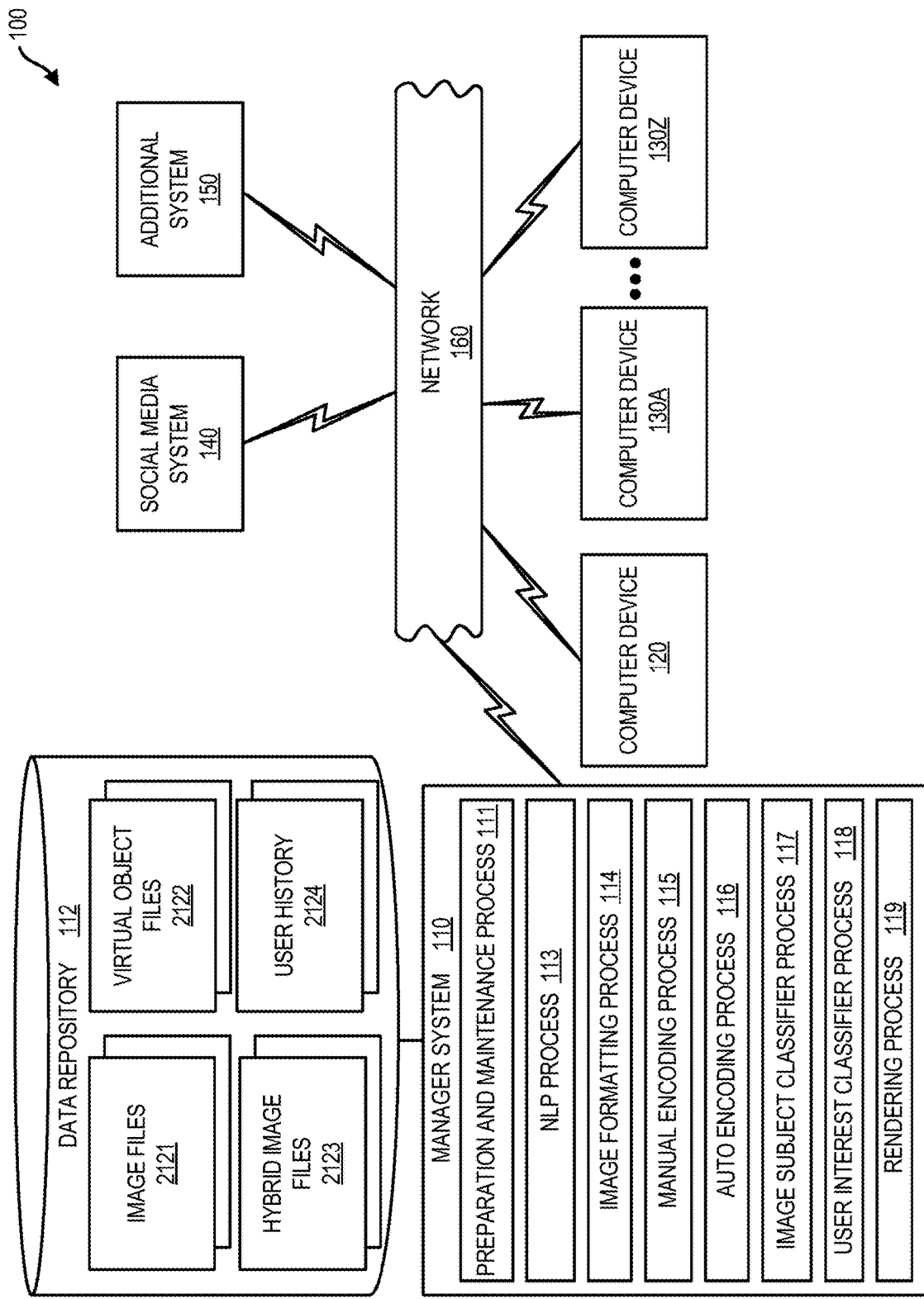
FIG. 1 depicts a system having manager system and a social media system in one embodiment.

A system 100 for formatting and rendering image files e.g. still image files and/or video files is shown in FIG. 1. System 100 can include manager system 110 having an associated data repository 112, administrator user computer device 120, user computer devices 130A-130Z, social media system 140 and one or more additional system 150. Manager system 110, computer device 120, computer devices 130A-130Z, and social media system 140 can be in communication with one another via network 160. Network 160 can include one or more of a physical telecommunications network or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

Manager system 110 can run preparation and maintenance process 111, natural language processing (NLP) process 113, image formatting process 114, manual encoding process 115, auto encoding process 116, image subject classifier process 117, user interest classifier process 118, and rendering process 119. Manager system 110 in one embodiment can be external and remote from computer devices 130A-130Z and social media system 140. Manager system 110 in one embodiment can be entirely or partially co-located with one or more computer device e.g. computer devices 130A-130Z and/or social media system 140.

Data repository 112 can store various data for use by processes that are run by manager system 110. Data repository 112 can store for example, in image files area 2121 image files e.g. physical image files and virtual image files. Image files of image files area 2121 can include background and foreground image data. Data repository 112 in virtual object files area 2122 can store virtual object files, which are files specifying image data of virtual objects. Data repository 112 in hybrid images files area 2123 can include a collection of image files that are formatted by image formatting process 114 run by manager system 110. Data repository 112 and user history area 2124 can store data records of users of system 100. User history area 2124 can store data of various users such as users of social media system 140. Data of user history area 2124 can be used by manager system 110 to determine subject matter interests of users of system 100 e.g. whether users of system 100 like reading, picnicking, sailing, or have any other interests.

Manager system 110 can run NLP process 113 to process data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) part of speech tagging to determine a part of speech classification of each word in a text string, (d) name entity recognition (NER) to classify text as relating to people or places, or (e) other NLP classifications and output of one or more other NLP output parameter for the received message. Topic analysis for topic classification and output of NLP output parameter can include topic segmentation to identify several topics within a message. Topic analysis can apply a variety of technologies e.g. one or more of hidden mark model (HMM), artificial chains, and passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (that is to say, the emotional state of the author when writing), or the intended emotional communication (that is to say, the emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and/or "sadness."

NLP process 113 can run a speech to text process to convert voice samples to text based messages. Output messages output from a speech to text process can be input into text classifiers of NLP process such as the topic, sentiment, and/or part of speech classifiers as set forth herein. Accordingly, NLP process 113 can be configured to process voice based messages and/or text based messages.

Figure 2:
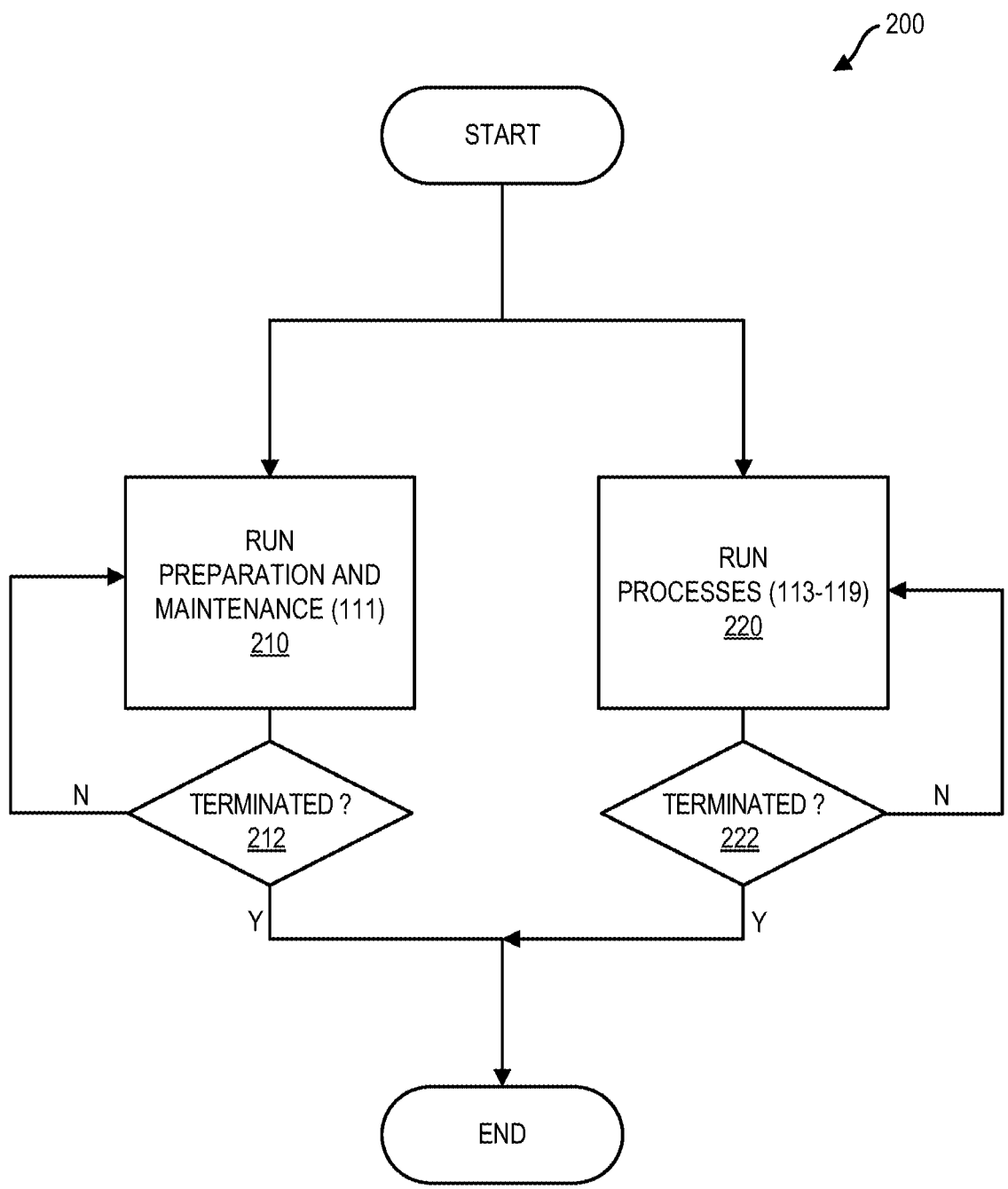
FIG. 2 is a flowchart illustrating a method for use in encoding image data in one embodiment.

FIG. 2 is a flowchart illustrating a method 200 that can be performed by manager system 110. At block 210, manager system 110 can run preparation and maintenance process 111 to populate, prepare, and maintain various data of data repository 112 including data of area 2121, area 2122, area 2123, and area 2124. Manager system 110 can run preparation and maintenance process 111 until process 111 is terminated at block 212. At block 220, manager system 110 can run one or more of processes 113-119. Manager system 110 can run one or more or processes 113-119 until each of processes 113-119 is terminated at block 222. For performance of preparation and maintenance process 111, manager system 110 can be configured to automatically process messages that are generated by one or more data source e.g. social media system 140 which can store various content in the form of posting by users. Manager system 110 can receive messages e.g. from social media system 140 and can process such messages e.g. by running NLP process 113 for storage of tagged data records in areas 2121-2124. Manager system 110 can run preparation and maintenance process 111 and one or more of processes 113-119 concurrently.

Reference is now made to image formatting process 114, which can be run by manager system 110. In one embodiment, manager system 110 can run image formatting process 114 to format image files e.g. still image files or video files having a combination of physical image data and virtual image data. Formatted image files, formatted by running of image formatting process 114 can include characteristics as are set forth in FIG. 3. A formatted image file having a hybrid collection of physical image data and virtual image data is explained with reference to image file 300 depicted in FIG. 3. Image file 300 can include various data fields e.g. header data fields 302, voxel data fields 306, and footer data fields 310. Referring to image file 300 as illustrated with respect to FIG. 3, data fields for representative single voxel position $x_i$, $y_i$, $z_i$ as illustrated by reference numeral 314 can include physical image data and virtual image data. That is, data specifying physical image information and data specifying virtual image information. Physical image data encoded in voxel data fields 306 can include e.g. physical image data encoding a color value and physical image data encoding an opacity value for each voxel position. Virtual image data encoded in voxel data fields 306 can include e.g. virtual image data encoding a color value and virtual image data encoding an opacity value for each voxel position for which there is encoded virtual image data. The encoding indicated by representative data field 314 for a single voxel position can be repeated for each of several voxel positions. In a voxel image data file according to FIG. 3, a virtual object can be represented with image data that is specified for a set of voxel positions. For each of the voxel positions for which virtual image data is specified there can also be encoded physical image data. Physical image data for an arbitrary set of voxel positions of a base image file can be retained even as virtual image information is specified for the arbitrary set of voxel position. For each voxel position representing a portion of a virtual object that is specified, physical image data can be retained for the voxel position. On rendering of an image file formatted according to format depicted in FIG. 3, the virtual image data for a certain set of voxel positions or alternatively the physical image data for the certain set of voxel positions can be rendered based on control data associate with the rendering. In further reference to FIG. 3, image file 300 can include data fields 318 that specify indexing data, conveniently located in the file header. Indexing data can associated identifiers for virtual objects with voxel positions for the various objects for which there is specified both virtual image information and physical information.

TABLE A

| Virtual Object Identifier | Description | Voxel Positions |
|---|---|---|
| 001 | Cube | $X_{20}$-$X_{40}$, $Y_{50}$-$Y_{70}$, $Z_{100}$-$Z_{120}$. |
| 002 | Rectangular Cuboid | $X_{60}$-$X_{80}$, $Y_{90}$-$Y_{110}$, $Z_{150}$-$Z_{200}$. |
| 003 | Picnic Basket | Collection of voxel positions defining irregular 3D volume |
| 004 | Umbrella | Collection of voxel positions defining irregular 3D volume |
| ... | ... | ... |

Referring to Table A, virtual object identifier 001 can specify a cube having the voxel positions $X_{20}$-$X_{40}$, $Y_{50}$-$Y_{70}$, $Z_{100}$-$Z_{120}$, virtual object identifier 002 can specify a rectangular cuboid having the voxel positions $X_{60}$-$X_{80}$, $Y_{90}$-$Y_{110}$, $Z_{150}$-$Z_{200}$, virtual object identifier 003 can specify a picnic basket at a collection of voxel positions defining an irregular three dimensional (3D) volume, and virtual object identifier 004 can specify an umbrella at a collection of voxel positions defining an irregular 3D volume.

Figure 3:
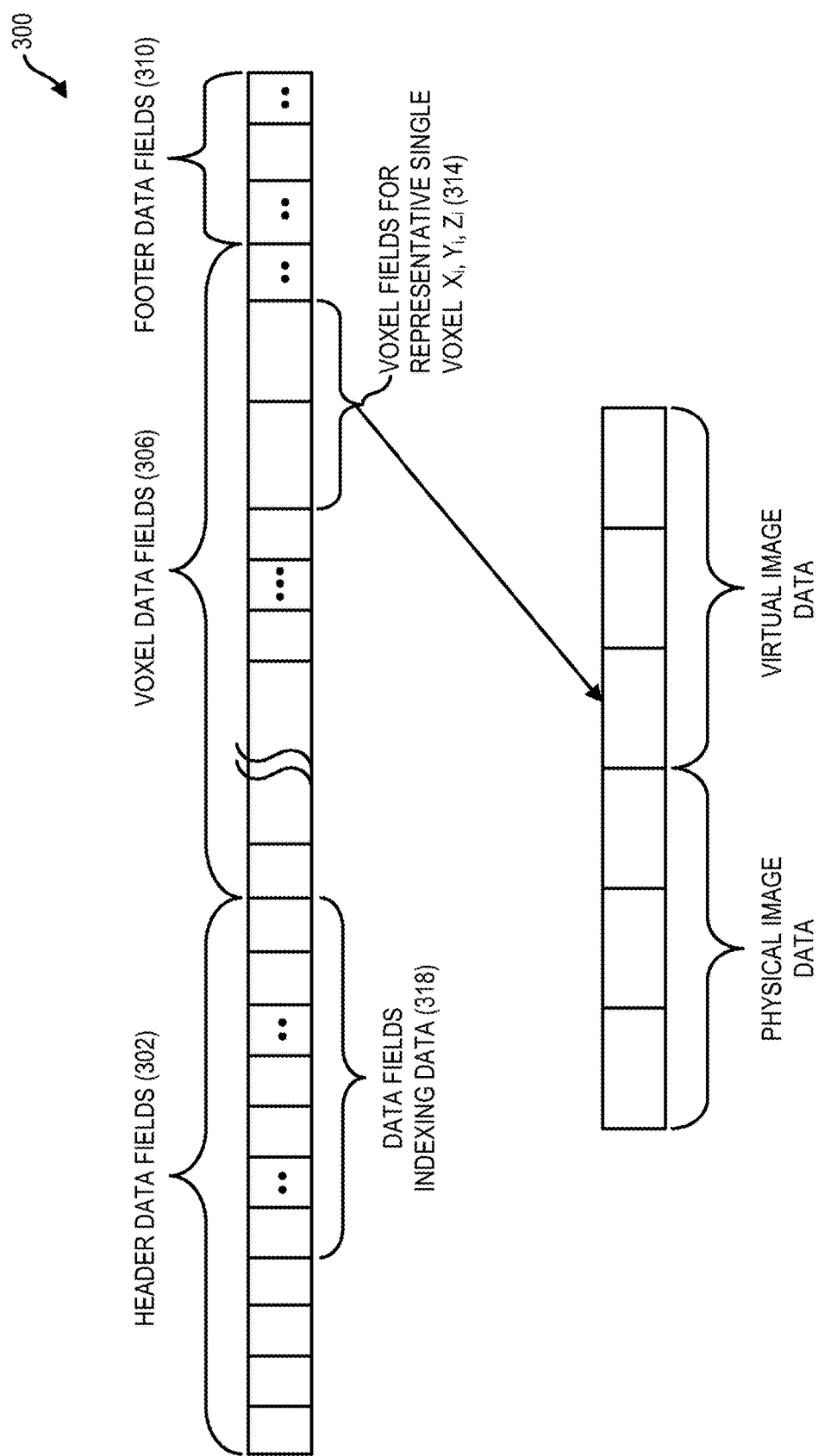
FIG. 3 depicts a format for an image file in one embodiment.

According to the image file formatting described in reference to FIG. 3, the physical image data for each of a plurality of voxel positions can be retained within image file 300 even though virtual image data has been specified for those voxel positions. An advantage of such formatting is that rendering of the image file can be readily toggled between an original base image view wherein the virtual object is not rendered, and an augmented reality image view wherein an encoded virtual object is rendered with physical image data. A plurality of advantages are yielded by combining physical image data and virtual image data within a common image file e.g. having a single header having a set of header data fields and a single footer having a set of footer data fields. Image file 300 encoding physical image data and virtual image data can be transferred between file directories. Common file association of physical image data and virtual image data can reduce computational overhead associated with tracking, maintaining, sending and organizing multiple data files. Common file encoding of physical image data and virtual image data can facilitate transmission of physical image data with associated virtual image data via transmission, e.g. in accordance with the file transfer protocol (FTP), of a single image file between network devices which can be network devices remote from one another e.g. between a server of manager system 110 and a computer device of computer devices 130A-130Z.

Figure 4:
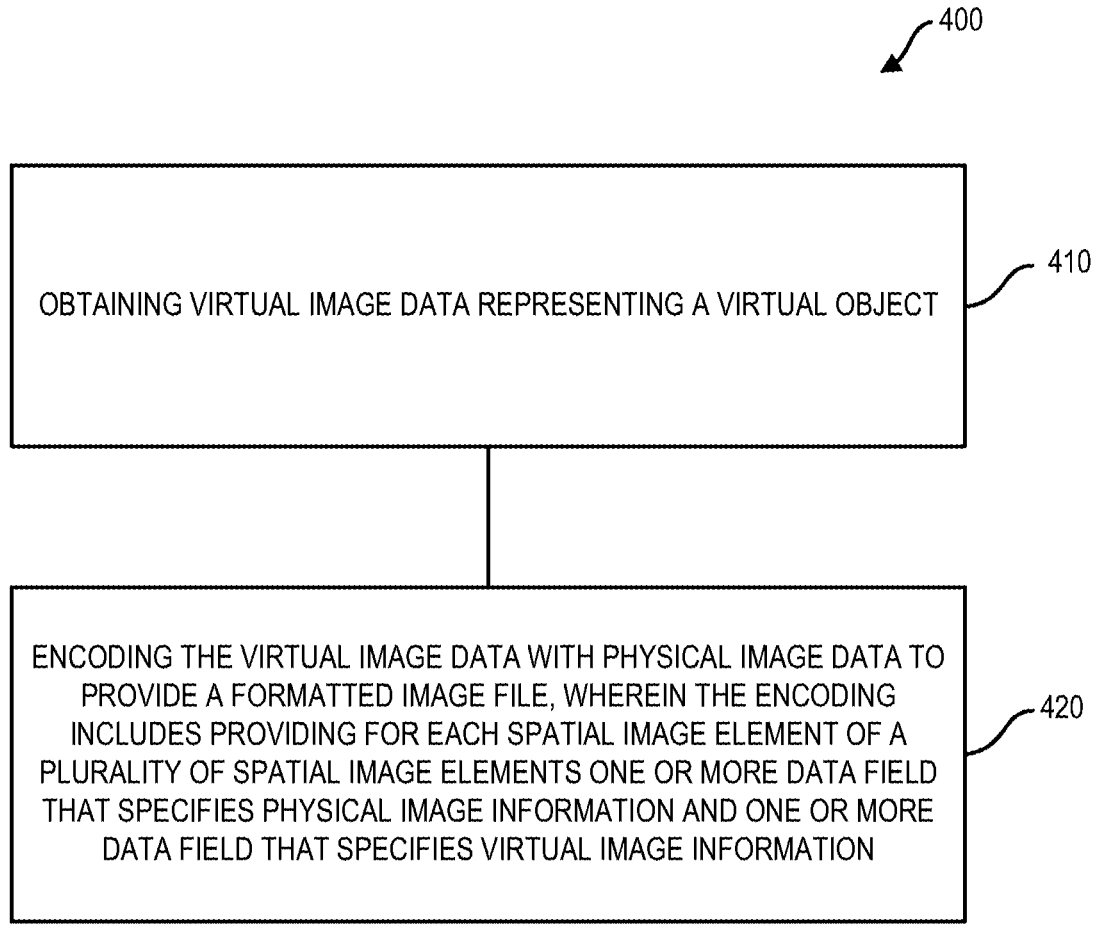
FIG. 4 is a flowchart illustrating a method for use in encoding image data in one embodiment.

A method 400, which can be performed by manager system 110 in one embodiment is set forth in reference to the flowchart of FIG. 4. At block 410, manager system 110 can perform obtaining virtual image data representing a virtual object. At block 420, manager system 110 can perform encoding the virtual image data with physical image data to provide a formatted image file, wherein the encoding includes providing for each spatial image element of a plurality of spatial image elements in one or more data fields that specifies physical image information and one or more data fields that specifies virtual information.

Obtaining virtual image data at block 410 in one embodiment can include running manual encoding process 115 to obtain virtual image data defined by user data that has been specified by a using a manually operated user interface. Obtaining virtual image data at block 410 can include running auto encoding process 116. In one embodiment, running auto encoding process 116 can include running image subject classifier process 117 and/or user interest classifier process 118, so that a hybrid image file 300 having virtual image data and physical image data is automatically encoded.

Encoding the virtual image data at block 420 in one embodiment can include performing the encoding so that the formatted image file includes physical image information and virtual image information for each spatial image element of a plurality of spatial image elements and wherein the encoding includes providing indexing data that associates an identifier for the virtual object to a set of spatial image elements for the virtual object so that the formatted image file includes the indexing data. The plurality of spatial image elements can include all or less than all spatial image elements of an image file.

In one embodiment as set forth in reference to FIG. 3 illustrating aspects of a formatted image file 300, indexing data of indexing data fields 318 can specify voxel positions for one or more virtual object, and physical image data for the voxel positions for which virtual image data is specified can be retained in hybrid image file 300. In the embodiment described with respect to FIG. 3, spatial image elements are illustrated as being provided by voxel positions wherein each voxel position represents a volume in three dimensional physical space. In another embodiment, the spatial image elements can be provided by pixel positions of a two dimensional image map.

Figure 5:
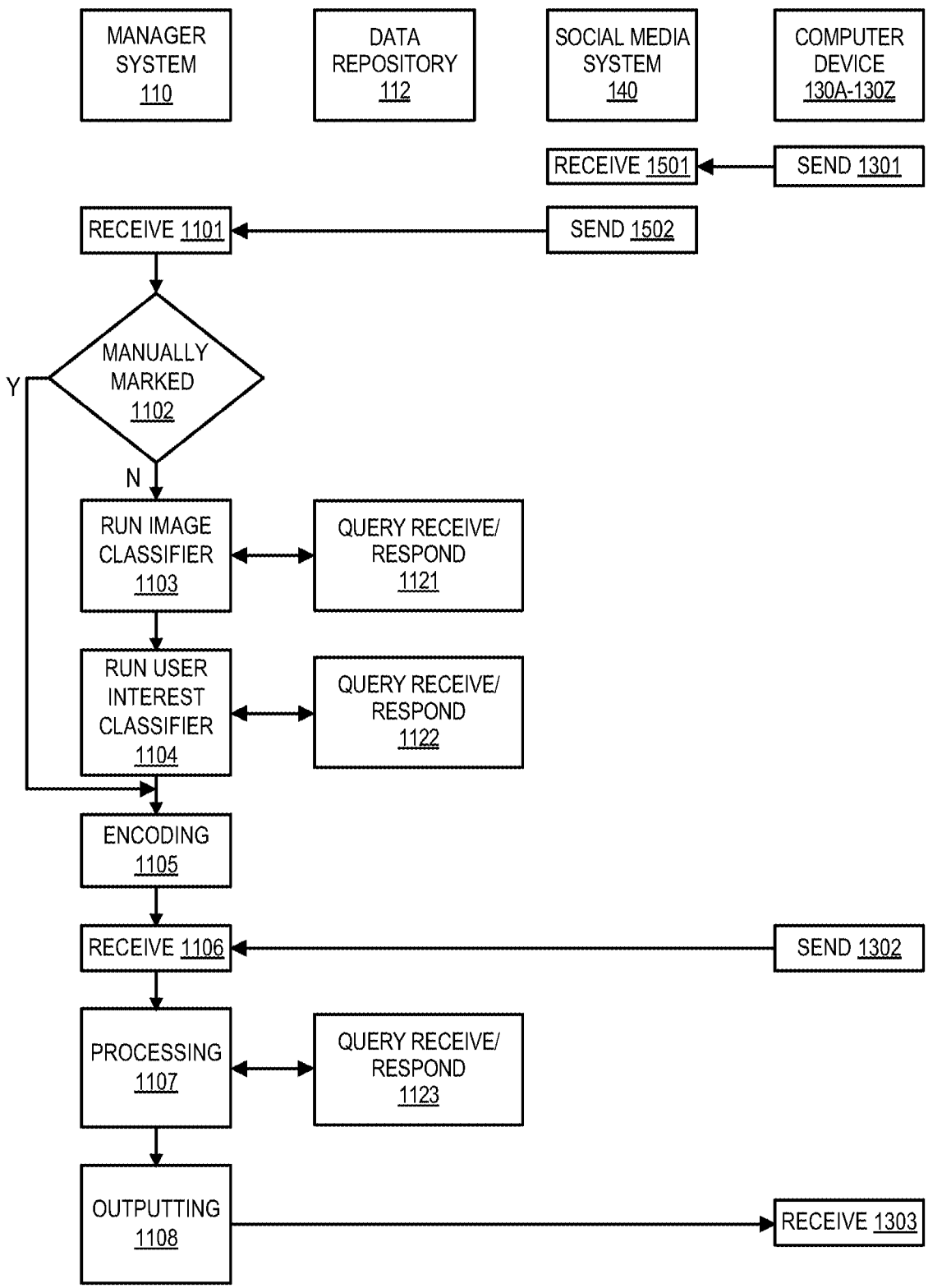
FIG. 5 is a flowchart illustrating a method for use in encoding image data in one embodiment.

FIG. 5 is a flowchart illustrating a specific embodiment of method 400 (FIG. 4) from the perspective of manager system 110, its associated data repository 112, social media system 140, and user computer devices 130A-130Z.

At block 1301, computer devices of computer devices 130A-130Z can be sending configuration data for use in performing image encoding that specifies certain user designated markups to image files for receipt by social media system 140 at block 1501. Based on such configuration data, social media system 140 at block 1502 can send configuration data to manager system 110 for receipt by manager system 110 at block 1101.

Figure 6:
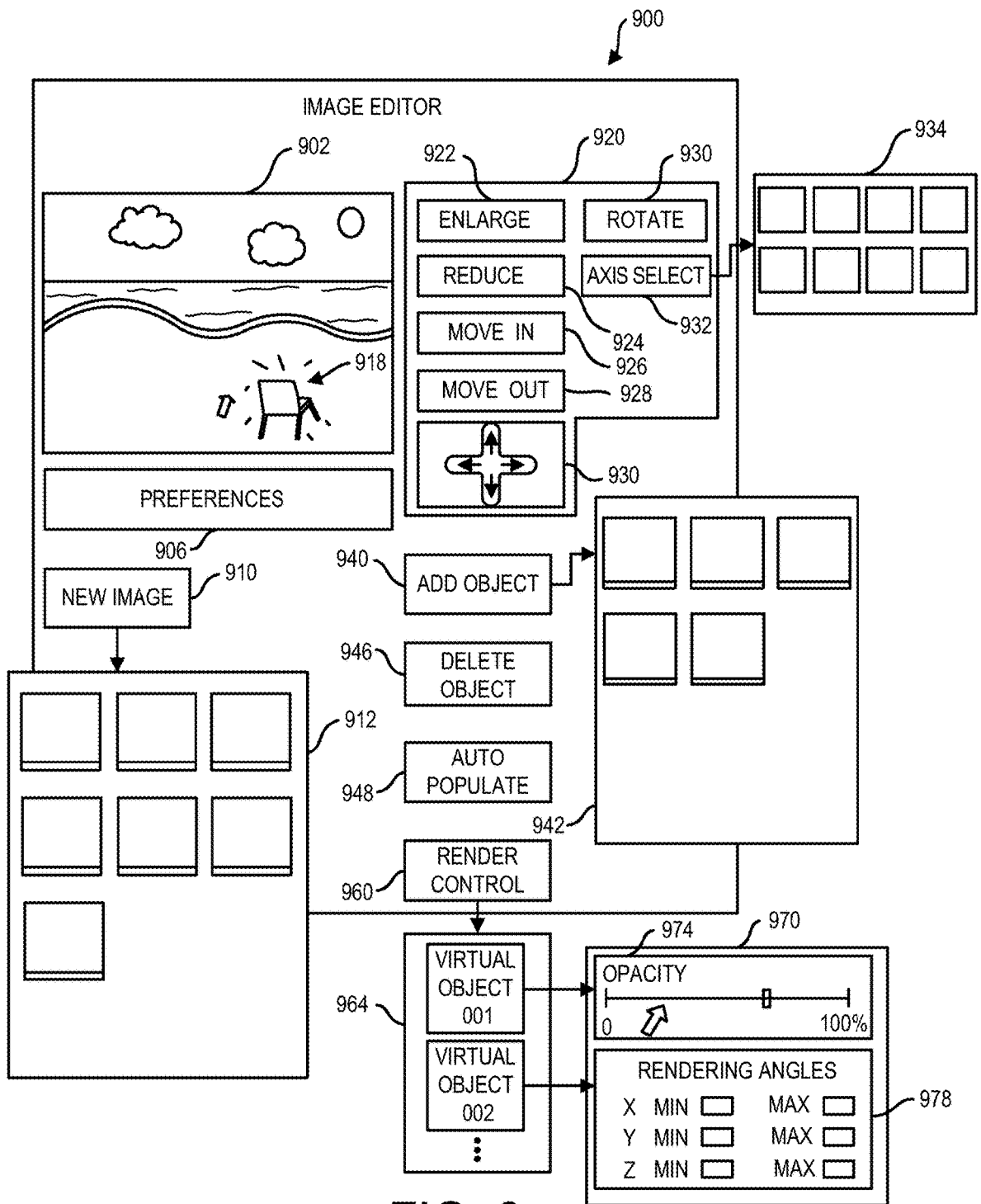
FIG. 6 depicts a user interface for specifying virtual image data for inclusion in a base image in one embodiment.

For defining configuration data sent at block 1301 users at various computer devices of computer devices 130A-130Z can use a manually operated user interface 900 as set forth in FIG. 6. User interface 900 can be displayed in a display of a computer device of computer devices 130A-130Z and in one embodiment can be provided by a webpage served by a server of manager system 110. In area 902, there can be rendered an image file of image files area 2120. The rendered image of image files area 2120 can be a rendered physical image file e.g. provided using a camera of a user computer device e.g. computer device 130A-130Z. The rendered image file rendered in image area 902 can be e.g. a two dimensional flat image file or in one embodiment can be provided by rendering of a three dimensional image file having three dimensional point cloud image data. The image file subject to rendering in area 902 can include image data defining a background for a formatted image file. The image file subject to rendering in area 902 to which virtual objects can be added can be regarded to define a base image. For providing an image file having three dimensional image data e.g. including voxel positions a computer device such as computer devices 130A-130Z can include a camera having three dimensional image capture functionality e.g. can include a laser scanning camera system or can include a camera system capable of stereoscopic image capture. A base image rendered in area 902 can include a combination of two dimensional and three dimensional image data. For providing base images that include e.g. distant backgrounds that are challenging to capture using a camera having three dimensional image capture functionality, a base image can include a combination of physical image data captured using a three dimensional image capturing camera and a two dimensional image capturing camera.

In area 906, a user can specify traditional image preferences e.g. involving contrast, brightness, hue, and the like. Using area 910, a user can select a new image for use as a base image. On selection of button 910, window 912 can be displayed that displays thumbnails indicating alternative candidate image files for selection and rendering in area 902. At area 918, a virtual object that has been selected by a user can be rendered within the rendered image data including physical image data, rendered in area 902.

Using area 920, a user can specify various placement options in respect to a selected virtual object, a user can enlarge a virtual object using button 922, reduce a virtual object using button 924, move in the virtual object using button 926, move out the virtual object using button 928, move the virtual object up, down, right, or left using selector 930, rotate the object along an axis using axis selection button 932, and can select a specified candidate axis using axis selection area 934.

By activating button 940, a user can specify added objects for inclusion in an image file. On selection of button 940, area 942 provided by a window can be displayed to display various thumbnail images, each of which indicate a different virtual object for selection. On selection of delete object button 946, a highlighted virtual object being rendered in area 902 can be removed from the rendering. Manager system 110 can generate the virtual objects displayed in thumbnail view in area 932, e.g. by searching one or more additional system 150 which may provide databases of virtual objects including two dimensional or three dimensional virtual objects. Manager system 110 can generate virtual objects displayed in thumbnail view in area 942 by processing of physical, virtual, or augmented realty (having both physical and virtual image data) image file stored e.g. in repository 112 or social media system 140. For example manager system 110 in one embodiment can apply a Gabor filter to identify and extract image data representing an object from an existing physical, virtual, or an augmented reality image file and can optionally enhance the image data representing the object for providing of a virtual object. Enhancing of image data represented in the object can include e.g. adding predetermined content, enhancing features, adding personalized content.

For rendering of virtual object at area 918 in the rendered image area 902, manager system 110 can use digital model and animation technologies to produce real time changes in the rendering of object 918 in response to user input using area 920.

Based on the user defined configuration data entered using area 940 providing an activation button, area 942 and area 920, computer device 130A-130Z can send configuration data at block 1302 specifying positions in which a virtual object is to be rendered. On receipt of user defined configuration data at block 1102, manager system 110 can determine whether the received user defined data indicates that there has been a manual markup of one or more image and if so manager system 110 can activate manual encoding process 115 (FIG. 1) and can proceed to block 1105 to perform encoding of virtual image data with physical image data to provide a formatted image file formatted according to hybrid image file 300 (FIG. 3) having both virtual image data and physical image data.

In running of manual encoding process 115, manager system 110 at block 1105 can perform encoding of an image file as described in reference to FIG. 3 based on user defined configuration data specifying image markups that are defined using a manually operated user interface such as user interface 900 described in reference to FIG. 6. In one example, the physical image data defining a base image is as shown in FIG. 7. FIG. 7 is an image representation obtained using a camera of a computer device 130A-130Z e.g. a two dimensional image capturing camera or a three dimensional image capturing camera. As shown in FIG. 8, a first user "user A" using computer device 130A can use area 940, 942, and 920 of user interface 900 to markup image representation of FIG. 7 to include first virtual objects, illustrated in area 702 of FIG. 8. A second user "user B" using computer device 130B can use areas 940, 942, and 920 to specify second virtual objects for inclusion and image representation 700, renderings of which are shown in area 706 of FIG. 9. A third user "user C" using computer device 130C can use areas 940, 942, and 920 of user interface 900 to specify inclusion of a third virtual object, a rendering of which is shown in area 720 of image representation 700 of FIG. 10.

Based on the user defined configuration data specifying markups of a physical image file, manager system 110 can perform encoding of an image file at block 1105 to include virtual image information at voxel locations the image file being formatted in accordance with the locations specified by users A, B, and C using user interface 900.

If manager system 110 at block 1102 determines that manual markup configuration data has not been specified by a user, manager system 110 can proceed to blocks 1103-1105 and activate auto encoding process 116. With auto encoding process 116 active manager system 110 can automatically encode virtual image data with physical image data to provide a formatted a hybrid physical and virtual image file. In accordance with an auto encoding process, manager system 110 can perform matching of a topic of a physical image to a determined interest of a user and can perform encoding of virtual image data with physical image data in accordance with matching. At block 1103, manager system 110 can run image subject classifier process 117 to determine one or more topic classifier for a physical image file defining a base image. Processing at block 1103 can include multiple queries to data repository 112 as indicated by receive and response block 1121 of data repository 112. Manager system 110 can examine an image file designated for encoding by examining topic tags thereof in the case the image file has been previously subject to NLP processing by NLP process 113 or can subject the image file to NLP processing by NLP process 113 if the image file designated for encoding has not been previously subject for NLP processing by NLP process 113. Manager system 110 can tag an image file corresponding to representation 700 with such tags as "beach", "sand", "water", and the like. At block 1104 manager system 110 can run user interest classifier process 118 to classify interests of one or more users. To determine interests of a user, manager system 110 can run user interest classifier process 118 at block 1104. Processing at block 1104 can include multiple queries to data repository 112 as indicated by receive and response block 1122 of data repository 112. To determine interests of a user, manager system 110 can examine data records of a user e.g. records stored in user history area 2124 corresponding to postings of a user on social media system 140. Interests of a user can be determined based on a threshold percentage of records of the user specifying a topic e.g. if a topic is referenced by more than a threshold percent of records of the user, the topic may be deemed to be an interest of the user. Manager system 110 can use e.g. bag of words tools to match topics of a physical image to interests of a user. On the determination of a match, manager system 110 can locate a virtual object file e.g. from area 2122. On performance of the match and the locating of a virtual object file in accordance with the match manager system 110 can proceed to block 1105 to perform encoding in accordance with an automated encoding process. Virtual image data of the located virtual object file can be used for the encoding of virtual image data with physical data. Absent manual configuration data that specifies a location of virtual object a location of a virtual object can be performed by various alternative means e.g. by examining past encoding configuration data defined by of a user to determine preferences of a user and/or by autopopulating a virtual object in an open area of a base image, examining tags of virtual object files specifying location rules.

Referring again to FIGS. 7-10, additions of virtual image data to physical image data defining a base image can be performed automatically as well as manually as previously described. For example, the addition in area 702 depicted in FIG. 8 can be performed automatically in accordance with an automated determination by running of user interest classifier process 118 that a user interest includes reading outdoors, resulting in a locating of a virtual object of a beach chair with an umbrella as depicted in FIG. 8. The addition in area 706 depicted in FIG. 9 can be performed automatically according to a determination by running of user interest classifier process 118 that a user has an interest in picnics and a locating of the virtual objects (picnic blanket and picnic basket) as depicted in FIG. 9. The addition in area 710, depicted in FIG. 10 can be performed automatically according to a determination by running of user interest classifier process 118 that a user has an interest in sailing and a locating of a virtual object file depiction of the sailboat.

Referring again to user interface 900 as depicted in FIG. 6, user interface 900 can include autopopulate button 948. When autopopulate button 948 is activated by a user, configuration data defined by a user using user interface 900 can indicate that the user does not wish to manually designate any particular virtual object for inclusion in physical image data, but rather specifies that manager system 110 is to autopopulate and autoencode e.g. by activation of auto encoding process 116, one or more virtual object according to an auto encoding process in which the user interests are determining by running of user interest classifier process 118.

At block 1302, one or more computer device of computer devices 130A-130Z can send requests for image renderings to manager system 110 for receipt by manager system 110 at block 1106. Requests sent at block 1302 can be sent based on data entered into a manually operated user interface or the requests sent at block 1302 can be automatically generated for sending. The request received at block 1106 can pertain to a hybrid physical and virtual image file 300 (FIG. 3) that was subject to encoding at block 1105. At block 1107 manager system 110 can perform processing of a request for rendering, received at block 1106. Processing at block 1107 can include multiple queries to data repository 112 as indicated by query receive and response block 1123 of data repository 112. Processing at block 1107 by manager system 110 can include processing to determine control data for controlling rendering of a formatted hybrid image file. Processing at block 1107 can include processing to determine a topic of one or more virtual object and/or interests of the one or more user who has specified a request for an image rendering received at block 1106. Processing at block 1107 can include activating an image subject classifier process 117 to determine one or more topic of one or more virtual object encoded in an image file 300. Processing at block 1107 can include activation of user interest classifier process 118 as set forth herein to determine interests of a user. As indicated with reference to FIG. 3, formatted image file 300 can include indexing data within data field 318 that indicate virtual object identifiers and spatial element locations in which the various digital objects are represented. Manager system 110 can establish control data that can be included with an image file that specifies whether or not virtual image data will be rendered on the rendering of an image file. In the example described, an image file subject to encoding at block 1105 in accordance with the manual encoding process or an auto encoding process can have encoded therein, virtual image data representing the virtual objects represented at area 702, 706, and 710 as shown in FIG. 10.

In one embodiment, processing at block 1107 can include activation of rendering process 119 to facilitate rendering of an image file based on user data of a requesting user. Based on user data of a requesting user, in one embodiment manager system 110 can perform processing and can render zero or a subset of the virtual objects that are indicated by area 702, 706, and 710 based on user history data of the requesting user. Manager system 110 at block 1107 can activate image subject classifier process 117 to determine one or more topic of one or more virtual object encoded in an image file 300. Manager system 110 at block 1107 can activate user interest classifier process 118 to determine interests of one or more user associated to rendering request received at block 1106. Based on a determined interest of one or more user, manager system 110 at block 1107 can establish control data to control rendering of a hybrid image file 300 (FIG. 3) based on the determined interest. Control data can be established by manager system 110 so that if virtual image data encoded in a hybrid image file is in accordance with (e.g. matches according a matching criteria) an interest of a user, such virtual image data is subject to rendering. Manager system 110 can establish activating control data activating rendering of a virtual object based on a topic of a virtual object being in accordance with an interest of a user. If on the other hand, a virtual object is not in accordance with a determined interest of a user associated to a rendering request, control data for controlling rendering can specify that virtual image data for such virtual object is not subject to rendering. A method as set forth herein can include establishing activating control data for activating rendering of the virtual object based on a processing of the virtual object and user history data of a certain user indicating that a topic of the virtual object is in accordance with an interest of the user and rendering the image file for viewing by the certain user, the rendering including rendering a representation of the virtual object based on the activating control data.

Based on the processing at block 1107, manager system 110 can perform outputting at block 1108. Outputting at block 1108 by manager system 110 can include outputting of a message to one or more computer device e.g. computer devices 130D-130F of computer devices 130A-130Z, in accordance with the rendering request received at block 1108. Users initiating rendering requests can be users different from users subject to data examining for the encoding at block 1105. In the described example users subject to data examining (e.g. examining of user defined configuration data or history data of area 2124) for the encoding at block 1105 can be "user A" associated to computer device 130A "user B" associated to computer device 130B and "user C" associated to computer device 130C, and users associated to a rendering request can be can be "user D" associated to computer device 130D "user E" associated to computer device 130E and "user F" associated to computer device 130F.

Outputting at block 1108 can include outputting of a formatted hybrid image file subject to encoding at block 1105 to each of several computer devices e.g. computer device 130D-130F. Because virtual image data and physical image data can be encoded by encoding block 1105 in a common image file outputting at block 1108 can include transmission of virtual image data and physical image data by the transmission of a single image file, e.g. in accordance with the file transfer protocol (FTP). Outputting at block 1108 by manager system 110 can also include outputting of control data to the various computer devices 130D-130F. The control data can be control data for use by the respective computer devices 130D-130F for controlling rendering of the image on the respective computer devices 130D-130F.

Manager system 110 at block 1107 can determine control data for controlling rendering that is differentiated between different users e.g. in accordance with determined user interests. Thus, based on differentiated control data for controlling rendering, an encoded hybrid image file 300 can be differently rendered by different computer devices associated to different users e.g. the different users of different computer devices 130D, 130E, and 130F. Computer devices 130D-130F can have rendering engines distributed therein and can run rendering process 119. If the user of computer device 130D is determined to have an interest in sailing, manager system 110 can establish control data so that the virtual object depicted in area 710 is rendered by computer device 130D but not the virtual objects of areas 702 and 706 where the user does not have an interest in reading outdoors or picnicking. If the user of computer device 130E is determined to have an interest in reading outdoors but not picnicking or sailing, manager system 110 can establish rendering control data so that a rendering of the hybrid image file encoded at block 1105 is rendered by computer device 130E can render the virtual objects of area 702 but not of area 706 or 710 (FIG. 10). In the case manager system 110 determines that a user of computer device 130F has an interest in picnicking and an interest in sailing but does not have an interest in reading outdoors, manager system 110 can establish rendering control data at block 1107 for output at block 1108 with an encoded hybrid image file so that on receipt at block 1303, by computer device 130F, computer device 130F can render the formatted hybrid image file in a manner so that the virtual object of area 710 and 706 are rendered but not the virtual objects of area 702 (FIG. 10).

Rendering engines running rendering process 119 can be distributed into respective computer devices and can be run to render hybrid image file 300 having physical image data and virtual image data. For rendering hybrid image file 300 in one embodiment, rendering process 119 can be configured to render virtual image data in the manner of rendering physical image data. For example, rendering a virtual object at a certain x, y, and z perspective angle of view can be based the spatial image elements (e.g. voxel positions) occupied by the virtual object and spatial elements in the foreground of the spatial elements. Any virtual object in rendering of the virtual object will be rendered at each certain x, y, and z perspective angle of view unless there is a foreground blocking object at the certain x, y, and z perspective angle of view.

Rendering process 119 in one embodiment can render virtual image data of image file 300 differently than physical image data of image file 300. In one embodiment rendering process 119 can be run so that rendering a virtual object at a certain x, y, z perspective angle of view includes forcing rendering of the virtual object based on rendering of the virtual object being indicated to be blocked by foreground spatial elements. There is set forth herein in one embodiment rendering a formatted image file 300 that includes first spatial image elements having specified physical image information and second spatial image elements having virtual image information, wherein the rendering includes applying a first rendering process for rendering the physical image information and applying a second rendering process for rendering the virtual image information, wherein the second rendering process for rendering the virtual image information is differentiated from the first rendering process for rendering the physical image information.

Forcing rendering can include in one embodiment (a) identifying foreground blocking spatial image elements blocking rendering of a virtual object absent adjustment of rendering, and (b) adjusting an opacity of the foreground blocking spatial image element to facilitate rendering of the virtual object otherwise blocked from being rendered. There is set forth herein in one embodiment rendering a formatted image file 300 that includes first spatial image elements having specified physical image information and second spatial image elements having virtual image information, wherein the rendering includes applying a first rendering process for rendering the physical image information and applying a second rendering process for rendering the virtual image information, wherein the second rendering process for rendering the virtual image information is differentiated from the first rendering process for rendering the physical image information, wherein the second rendering process includes forcing rendering of the virtual image information based on foreground image data indicating that the virtual image information is blocked from being rendered, wherein the forcing rendering of the virtual image data includes identifying blocking spatial image elements that are in blocking relation to the virtual image information, and adjusting an opacity of the blocking spatial image elements.

In one embodiment rendering process 119 can use predetermined configuration data to render virtual image data differently from physical image data so that virtual image data is rendered where rendering is blocked without adjusting of rendering.

In one embodiment, rendering process 119 can render virtual image data of image file 300 differently from physical image data based on user defined configuration data defined by a user using a manually operated user interface 900 as shown in FIG. 6. Referring to user interface 900 as shown in FIG. 6 a user can activate button 960 to activate rendering control data configuration options. Using area 964 a user can select virtual objects, 001, 002, etc. for which rendering control data can be defined. Using area 970 a user can configure rendering control data for various selected virtual objects selected using area 964. Using area 974 of area 970, a user can define an opacity adjustment level of blocking spatial image elements identified in the (a) identifying stage herein. A user can adjust an opacity of blocking image data e.g. to a percentage value in the range of from 100 percent to 0 percent (in which case the blocking spatial image elements can be rendered to be entirely transparent). Using area 978 a user can define ranges for x, y, and z perspective angles of view at which rendering of a virtual object can be forced based on an image file including blocking spatial image elements. There is set forth herein in one embodiment rendering a formatted image file 300 that includes first spatial image elements having specified physical image information and second spatial image elements having virtual image information, wherein the rendering includes applying a first rendering process for rendering the physical image information and applying a second rendering process for rendering the virtual image information, wherein the second rendering process for rendering the virtual image information is differentiated from the first rendering process for rendering the physical image information, wherein the second rendering process includes forcing rendering of the virtual image information based on foreground image data indicating that the virtual image information is blocked from being rendered, and wherein the forcing rendering is performed in accordance with user defined rendering control data that is defined by a user using a manually operated user interface, and wherein the user defined rendering control data includes rendering control data selected from the group consisting of (a) rendering control data that specifies an opacity reduction of blocking spatial image elements, and (b) rendering control data that specifies a perspective viewing angle at which forced rendering will be active.

Manager system 110 can process user defined rendering control configuration data defined using user interface 900 with other configuration data received at block 1101 and sent at block 1301. In one embodiment manager system 110 running image formatting process 114 can encode rendering control data e.g. rendering control data controlling opacity of blocking spatial image elements and forced view angles e.g. in one or more header data field 302 of image file 300. Rendering control configuration data for a certain virtual object encoded within image file 300 can be associated to indexing data of indexing data fields 318 encoded in image file 300 for the certain virtual object.

Control data for use with hybrid image file 300 as shown in FIG. 3 can include control data other than rendering control data for controlling rendering of hybrid image file 300. In one embodiment, manager system 110 can user image file 300 to control a machine process e.g. a robot moving within an environment. In one embodiment, manager system 110 can be used to format image file 300 for use in controlling machine process. In such an embodiment system 100 can optionally be absent of social media system 140 or another external data source and image file 300 can be formatted based on configuration data defined by administrator user using user interface 900 displayed on a display of an administrator user computer device 120. A camera of an administrator user computer device 120 can be used to capture an image file representing a work environment having a certain obstacle, Object A that may fall in the path of a moving robot. An administrator using user interface 900 can select for augmenting such an image file a virtual object which represents Object A in greater detail than physical image data of the image file representing Object A. Manager system 110 can be operative so that a process control that references a formatted hybrid image file 300 (FIG. 3) for guiding of robot references either physical or virtual image data of the image file based on feedback data collected during operation of the robot. For example, for higher speed operation and a lower computational overhead, manager system 110 can guide the robot primarily based on physical image data of the hybrid image file 300 and not on virtual image data of the hybrid image file 300. Manager system 110 can establish control data so that manager system 110 referencing hybrid image file 300 for robot guidance switches to accessing of virtual image data of hybrid image file 300 on the satisfaction of a criteria e.g. the criteria that the robot is unable to complete a specified task related to Object A prior to a timeout. On the satisfaction of a criteria, manager system 110, based on established control data can switch to accessing virtual image data of image file 300 until another criteria is satisfied, in which case manager system 110 can return to reliance on physical image data of hybrid image file 300 for guidance. The format for hybrid image file 300 can include for a certain voxel position, both physical image data and virtual image data and can facilitate transition from physical image data to virtual image data with reduced computing resource consumption relative to an alternative method wherein a separate file including virtual image data may be accessed.

Certain embodiments herein may offer various technical computing advantages, involving computing advantages to address problems arising in the realm of computer networks such as relating to limitations of physical sensors such as camera sensors in generating useful data of an environment. Embodiments herein can provide results and advantages that are not possible or practical without use of components of a technical computing environment, such as providing for augmented reality solutions mixing physical image data and virtual image data that automatically adapt based on a variety of factors e.g. including interests of a user. Embodiments herein include features such as improved data structures that facilitate reduced processing overhead in computational intensive environments such as environments represented by three dimensional image data. Embodiments herein feature improved machine process control with reduced processing overhead in various machine control environments such as in machine robot process environments. Embodiments herein can include artificial intelligence processing platforms featuring improved processes to transform unstructured data into structured form permitting computer based analytics and predictive decision making.

Figure 11:
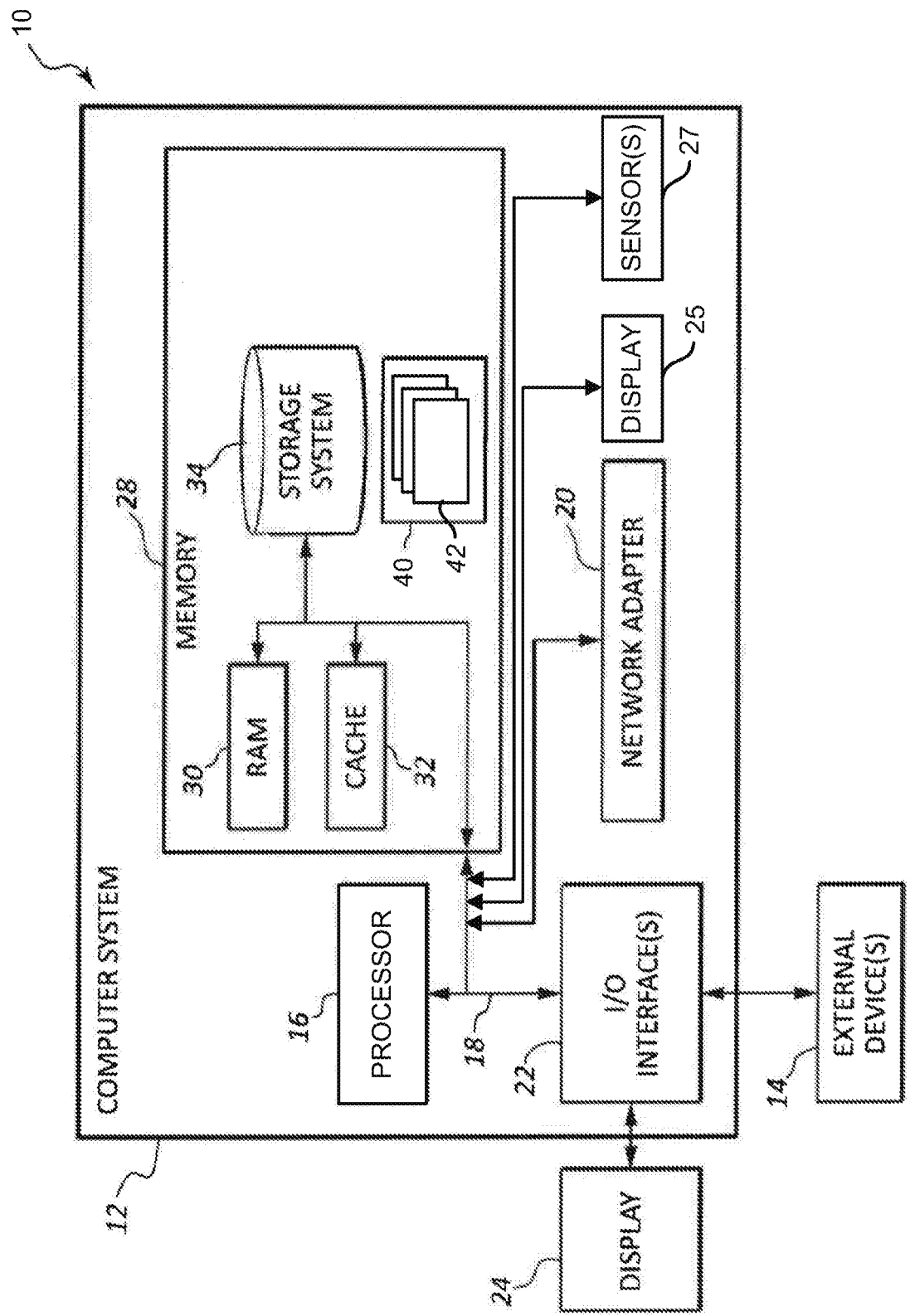
FIG. 11 depicts a computing node according to one embodiment.
Figure 12:
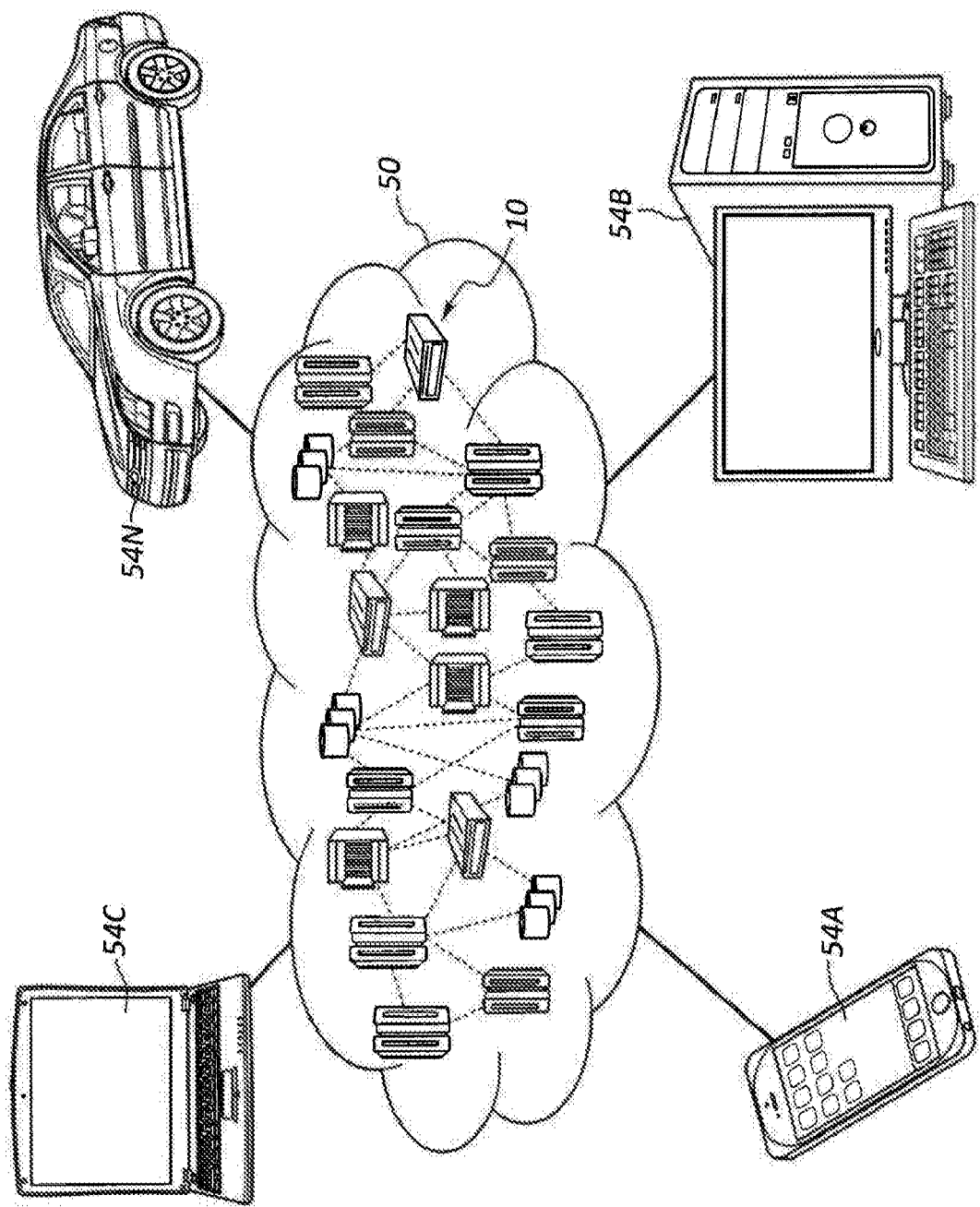
FIG. 12 depicts a cloud computing environment according to one embodiment.
Figure 13:
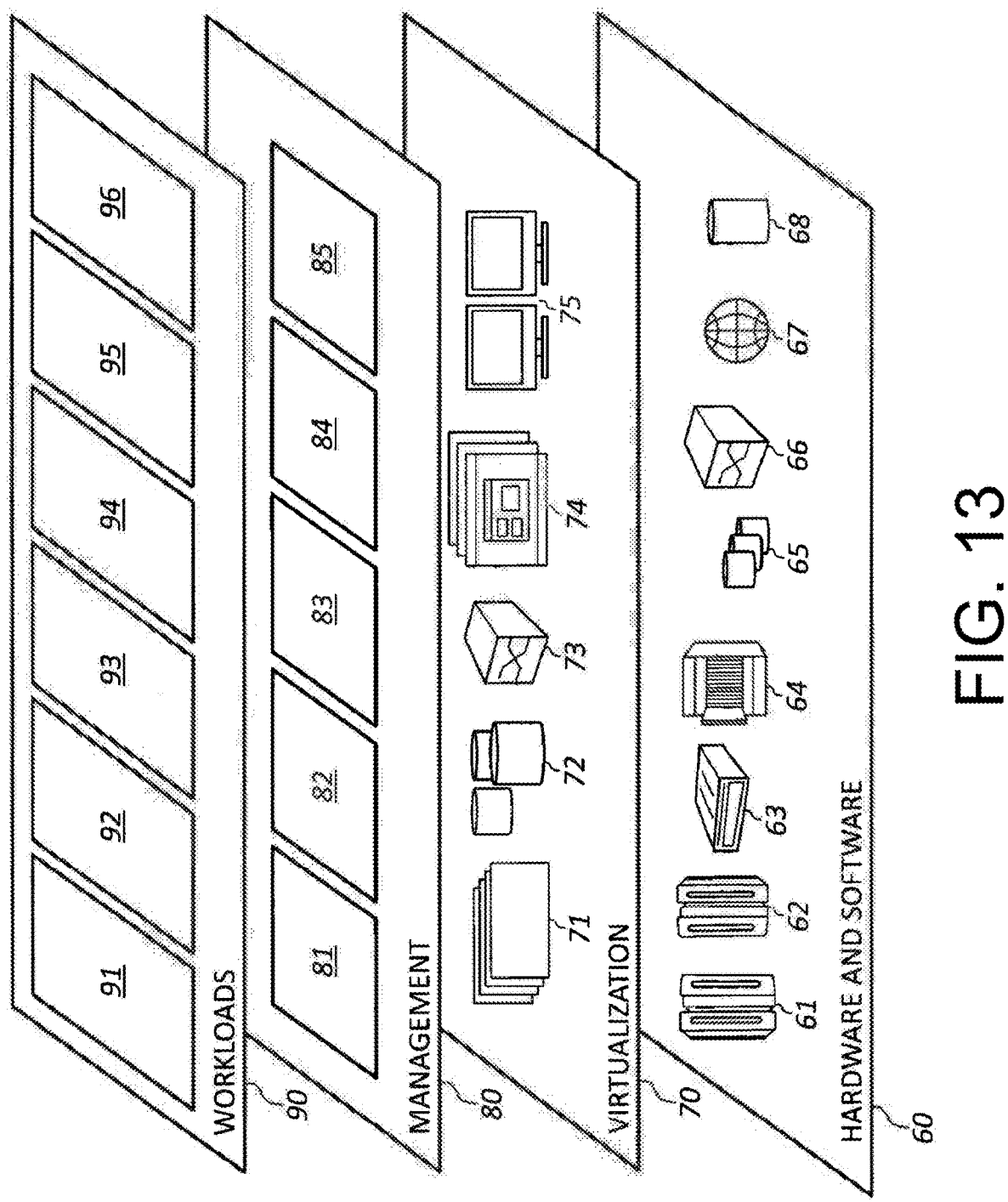
FIG. 13 depicts abstraction model layers according to one embodiment.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 4, and the functions described with reference to manager system 110 as set forth in the flowchart of FIG. 5. In one embodiment, social media system 140 can include one or more computing node 10 and can include one or more program 40 for performing functions described with reference to social media system 140 as set forth in the flowchart of FIG. 5. In one embodiment, one or more user computer device 130A-130Z can include one or more computing node 10 and can include one or more program 40 for performing functions described with reference to one or more user computer device 130A-130Z as set forth in the flowchart of FIG. 5.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 is intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for combining virtual image data and physical image data as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A method comprising:
using at least one computer hardware processor to perform:
generating an image using a formatted image file that encodes a physical image and a virtual image, wherein:
the formatted image file comprises pixel data fields and indexing data fields,
the pixel data fields include first data values for a first set of pixels in a two-dimensional space, the first data values encoding the physical image and specifying a respective color and/or opacity for each of at least some of the first set of pixels,
the pixel data fields include second data values for the first set of pixels in the two-dimensional space, the second data values encoding the virtual image and specifying a respective color and/or opacity for each of the at least some of the first set of pixels, and
the indexing data fields include data indicating widths and/or heights for the first set of pixels in the two-dimensional space; and
displaying the generated image.

2. The method of claim 1, wherein the indexing data fields of the formatted image file include data associating an identifier for a virtual object with the at least some of the first set of pixels.

3. The method of claim 1, wherein displaying the generated image comprises:
identifying foreground image data in the generated image that blocks the virtual image, and
adjusting an opacity of pixels associated with the foreground image data.

4. The method of claim 1, wherein displaying the generated image comprises displaying the generated image based on control data indicating whether the virtual image is to be included in the displayed image.

5. The method of claim 4, wherein the control data comprises first control data for use by a first computer device and second control data for use by a second computer device different from the first computer device.

6. The method of claim 4, wherein the control data is provided by a user via a user interface.

7. The method of claim 1, wherein displaying the generated image comprises displaying the virtual image at a perspective viewing angle based on whether blocking foreground image data exists at the perspective viewing angle.

8. The method of claim 1, wherein control data indicating an opacity adjustment of pixels associated with foreground image data that blocks the virtual image is encoded into one or more data fields of the formatted image file.

9. The method of claim 1, wherein control data indicating a perspective viewing angle at which display of the virtual image is forced is encoded into one or more data fields of the formatted image file.

10. A computer readable storage medium storing processor-executable instructions that, when executed by at least one processor, cause the at least one processor to perform a method comprising:
   generating an image using a formatted image file that encodes a physical image and a virtual image, wherein:
      the formatted image file comprises pixel data fields and indexing data fields,
      the pixel data fields include first data values for a first set of pixels in a two-dimensional space, the first data values encoding the physical image and specifying a respective color and/or opacity for each of at least some of the first set of pixels,
      the pixel data fields include second data values for the first set of pixels in the two-dimensional space, the second data values encoding the virtual image and specifying a respective color and/or opacity for each of the at least some of the first set of pixels, and
      the indexing data fields include data indicating widths and/or heights for the first set of pixels in the two-dimensional space; and
   displaying the generated image.

11. The computer readable storage medium of claim 10, wherein the indexing data fields of the formatted image file include data associating an identifier for a virtual object with the at least some of the first set of pixels.

12. The computer readable storage medium of claim 10, wherein displaying the generated image comprises:
   identifying foreground image data in the generated image that blocks the virtual image, and
   adjusting an opacity of pixels associated with the foreground image data.

13. The computer readable storage medium of claim 10, wherein displaying the generated image comprises displaying the generated image based on control data indicating whether the virtual image is to be included in the displayed image.

14. The computer readable storage medium of claim 13, wherein the control data comprises first control data for use by a first computer device and second control data for use by a second computer device different from the first computer device.

15. The computer readable storage medium of claim 13, wherein the control data is provided by a user via a user interface.

16. The computer readable storage medium of claim 10, wherein displaying the generated image comprises displaying the virtual image at a perspective viewing angle based on whether blocking foreground image data exists at the perspective viewing angle.

17. The computer readable storage medium of claim 10, wherein control data indicating an opacity adjustment of pixels associated with foreground image data that blocks the virtual image is encoded into one or more data fields of the formatted image file.

18. The computer readable storage medium of claim 10, wherein control data indicating a perspective viewing angle at which display of the virtual image is forced is encoded into one or more data fields of the formatted image file.

19. A system comprising:
   a memory;
   at least one processor in communication with the memory; and
   program instructions stored in the memory that, when executed by the at least one processor, cause the at least one processor to perform a method comprising:
      generating an image using a formatted image file that encodes a physical image and a virtual image, wherein:
         the formatted image file comprises pixel data fields and indexing data fields,
         the pixel data fields include first data values for a first set of pixels in a two-dimensional space, the first data values encoding the physical image and specifying a respective color and/or opacity for each of at least some of the first set of pixels,
         the pixel data fields include second data values for the first set of pixels in the two-dimensional space, the second data values encoding the virtual image and specifying a respective color and/or opacity for each of the at least some of the first set of pixels, and
         the indexing data fields include data indicating widths and/or heights for the first set of pixels in the two-dimensional space; and
      displaying the generated image.

20. The system of claim 19, wherein displaying the generated image comprises displaying the generated image based on control data indicating whether the virtual image is to be included in the displayed image.

* * * * *